(12) United States Patent
Yu et al.

(10) Patent No.: US 7,701,546 B2
(45) Date of Patent: Apr. 20, 2010

(54) METHOD AND APPARATUS FOR MANUFACTURING AN LCD

(75) Inventors: In-kwang Yu, Chungcheongnam-do (KR); Sung-jin Lee, Gyeonggi-do (KR); Do-young Kam, Gyeonggi-do (KR); Jung-kun Shin, Gyeonggi-do (KR); Goang-young Park, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 913 days.

(21) Appl. No.: 11/156,946

(22) Filed: Jun. 20, 2005

(65) Prior Publication Data

US 2006/0028611 A1    Feb. 9, 2006

(30) Foreign Application Priority Data

Jun. 22, 2004    (KR) .................... 10-2004-0046703

(51) Int. Cl.
*G02F 1/13* (2006.01)
(52) U.S. Cl. ..................................... 349/187
(58) Field of Classification Search ............ 349/187
See application file for complete search history.

(56) References Cited

U.S. PATENT DOCUMENTS

| 6,671,029 | B1 * | 12/2003 | Choi ............... 349/189 |
| 6,900,875 | B2 * | 5/2005 | Nakano et al. ........... 349/187 |
| 7,279,044 | B2 * | 10/2007 | Park et al. ............... 118/323 |
| 2005/0084606 | A1 * | 4/2005 | Park et al. ............... 427/162 |

FOREIGN PATENT DOCUMENTS

| JP | 57-139720 | 8/1982 |
| JP | 59-226324 | 12/1984 |
| JP | 60-156005 | 8/1985 |
| JP | 62-297815 | 12/1987 |

(Continued)

OTHER PUBLICATIONS

Office Action dated Jun. 15, 2007 from Chinese Patent Application corresponding to U.S. Appl. No. 11/156,946 and English Translation.

(Continued)

*Primary Examiner*—James A Dudek
(74) *Attorney, Agent, or Firm*—Innovation Counsel LLP

(57) ABSTRACT

A method of manufacturing an LCD comprising, preparing a liquid crystal panel which comprises a substrate assembly and a polarizing plate, wherein the polarizing plate is attached to the substrate assembly, disposing a gas injecting part towards the plate surface of the liquid crystal panel, while the gas injecting part is exposed to atmospheric conditions, and applying a pressure to the plate surface of the liquid crystal panel by injecting gas through the gas injecting part. With this configuration, the present invention provides a method to remove bubbles between the polarizing plate and liquid crystal panel without the use of a chamber.

15 Claims, 9 Drawing Sheets

FOREIGN PATENT DOCUMENTS

| | | |
|---|---|---|
| JP | 06-235896 | 8/1994 |
| JP | 09-203892 | 8/1997 |
| JP | 11-014827 | 1/1999 |
| JP | 2000-105078 | 4/2000 |
| JP | 2003-98520 | 4/2003 |
| JP | 2004-61940 | 2/2004 |
| KR | 2004-0036571 | 4/2004 |
| TW | 439007 | 6/2001 |
| TW | 573191 | 2/2004 |

OTHER PUBLICATIONS

English Language Abstract, Japanese Publication No. 2003-98520, Published Apr. 3, 2003, 1 p.

English Language Abstract, Japanese Publication No. 2004-61940, Published Feb. 26, 2004, 1 p.

English Language Abstract, Korean Publication No. 2004-0036571, Published Apr. 30, 2004, 1 p.

* cited by examiner

METHOD AND APPARATUS FOR MANUFACTURING AN LCD

CROSS-REFERENCE TO RELATED APPLICATIONS

This application claims the benefit of Korean Patent Application No. 2004-0046703, filed Jun. 22, 2004, in the Korean Intellectual Property Office, the disclosure of which is incorporated herein by reference.

BACKGROUND OF THE INVENTION

1. Field of the Invention

The present invention relates to a method of manufacturing a liquid crystal display (LCD) and an apparatus therefor, and more particularly, to a method of manufacturing an LCD and an apparatus for removing bubbles being formed between substrates and polarizing plates of a liquid crystal panel.

2. Description of the Related Art

An LCD comprises a liquid crystal panel which comprises a thin film transistor (TFT) substrate and a color filter substrate, the surfaces of which are respectively attached with polarizing plates, and a liquid crystal layer sandwiched between both substrates. Since the liquid crystal panel does not emit light itself, a backlight unit may be located behind the TFT substrate to supply light to the liquid crystal panel. The transmittance of light from the backlight unit depends on the alignment of the liquid crystal layer.

In addition, the LCD may further comprise a drive integrated circuit, a data driver and a gate driver to drive a pixel of the liquid crystal panel, wherein the data driver and the gate driver receive a driving signal from the drive integrated circuit and then apply a driving voltage on a data line and a gate line within display area respectively.

In the manufacturing process of the LCD, polarizing plates are attached to the outside plate surfaces of the TFT substrate and the color filter substrate. In this process, minute bubbles are formed between the substrates and the polarizing plates, thereby lowering the adhesion force therebetween and deteriorating display quality.

FIG. 1 is a perspective view showing a conventional bubble removing apparatus. The conventional bubble removing apparatus 100 comprises a chamber 110 and a door 120 which opens/closes the chamber 110. An accommodating part 130, in which liquid crystal panels 140 are loaded, is provided in the chamber 110. The bubble removing apparatus 100 further comprises a pump (not shown) to supply a compressed gas into the chamber 110, and a heater (not shown).

The method of removing the bubble using the above apparatus 100 will be explained.

First, the door 120 is opened to open the chamber 110. Then, the liquid crystal panels 140 are loaded into the accommodating part 130. At this time, the temperature and the pressure in the chamber 110 is room temperature and atmospheric pressure, respectively. The accommodating part 130 can be loaded with a plurality of liquid crystal panels 140 at the same time. The door 120 is shut to close the chamber 110 after the loading of liquid crystal panels 140 is completed.

Next, the temperature and the pressure are increased to predetermined levels. Generally, the temperature is increased to about 50° C., and the pressure is increased to about 5 kgf/cm². By these operations, heat and pressure are applied to the liquid crystal panels 140 in the chamber 110. Therefore, the bubbles formed between the substrates and the polarizing plates are moved towards the outside of polarizing plates thereby to be removed. When the removing of the bubbles is completed, the temperature and the pressure in the chamber 110 are decreased to room temperature and atmospheric pressure, respectively. Then, the door 120 is opened to open the chamber 110, and the liquid crystal panels 140 are unloaded.

FIG. 2 is a graph showing the change of temperature and pressure in the chamber 110 of the conventional bubble removing apparatus.

Referring to FIG. 2, the 'I' section corresponds to the increase of temperature and pressure from room temperature and atmospheric pressure to predetermined values, which normally takes 8 minutes. The 'II' section corresponds to maintaining the temperature and the pressure at the predetermined values, which normally takes 15 minutes. The 'III' section corresponds to the restoration of the temperature and the pressure to room temperature and atmospheric pressure respectively, which normally takes 7 minutes.

The conventional method of removing bubbles has several disadvantages. First, it requires a significant amount of time in increasing and decreasing the temperature and the pressure of the chamber. Second, the chamber type apparatus is not suitable for treating a large liquid crystal panel. That is, it is difficult to manufacture a chamber which can accommodate a liquid crystal panel having a length greater than 1 m. Further, as the size of the chamber is increased, the safety of the chamber is not guaranteed with ease. Third, the presence of a chamber in a manufacturing process makes the automation of the process difficult.

Basically, these problems come from the presence of chamber in order to remove bubbles.

SUMMARY

Accordingly, it is an aspect of the present invention to provide a method of manufacturing an LCD and an apparatus therefor which removes bubbles formed between a substrate and a polarizing plate of a liquid crystal panel without the use of a conventional chamber.

Additional aspects and advantages will be set forth in part in the description which follows and, in part, will be obvious from the description, or may be learned by practice of the invention.

The foregoing and/or other aspects of the present invention can be achieved by providing a method of manufacturing an LCD comprising preparing a liquid crystal panel which comprises a substrate assembly and a polarizing plate, wherein the polarizing plate is attached to the substrate assembly, disposing a gas injecting part towards a plate surface of the liquid crystal panel, while the gas injecting part is exposed to atmospheric and applying a pressure to the plate surface of the liquid crystal panel by injecting gas through the gas injecting part.

According to another aspect, the liquid crystal panel and the gas injecting part move relative to each other, while the gas is injected.

According to another aspect, the injected gas is preheated.

According to another aspect, the temperature of the preheated gas is 40-80° C.

According to another aspect, the gas injecting part comprises a plurality of nozzles to inject the gas, the nozzles being disposed opposite each other while the liquid crystal panel is disposed therebetween.

According to another aspect, the distance between the gas injecting part and the liquid crystal panel is 10-20 μm.

According to another aspect, the pressure applied by the injecting gas is 0.1-6.0 kgf/cm².

According to another aspect, the gas is injected to the liquid crystal panel from a central region to the outer region of the plate surface of the liquid crystal panel.

The foregoing and/or other aspects also can be achieved by providing an apparatus for manufacturing an LCD, wherein the LCD comprises a liquid crystal panel, the apparatus comprising: a compressed gas supply unit which supplies a compressed gas, and a gas injecting part which is exposed to the atmosphere and injects the compressed gas from the compressed gas supply part, to apply a predetermined pressure to a forward.

According to another aspect, the apparatus for manufacturing an LCD further comprises a support part to support the liquid crystal panel.

According to another aspect, the gas injecting part comprises a plurality of nozzles, which are disposed in a plate-shape.

According to another aspect, an injecting area of the gas injecting part has a band-shape.

According to another aspect, the injecting area of the gas injecting part is not smaller than the liquid crystal panel.

According to another aspect, the gas injecting part comprises a plurality of nozzles to inject the gas, which are disposed opposite each other with the liquid crystal panel being disposed therebetween.

According to another aspect, the apparatus for manufacturing an LCD further comprises a preheating part which preheats the gas.

BRIEF DESCRIPTION OF THE DRAWINGS

These and other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Figure 1:
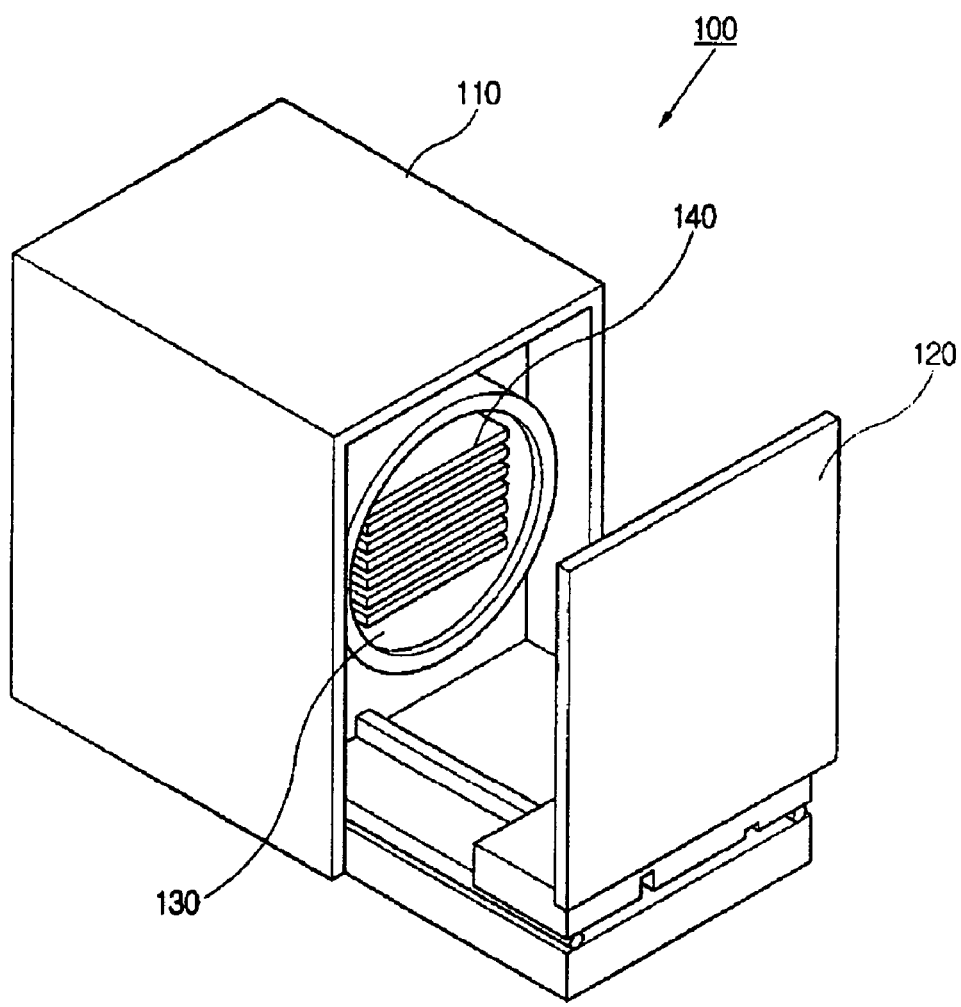
FIG. 1 is a perspective view showing a conventional bubble removing apparatus.
Figure 2:
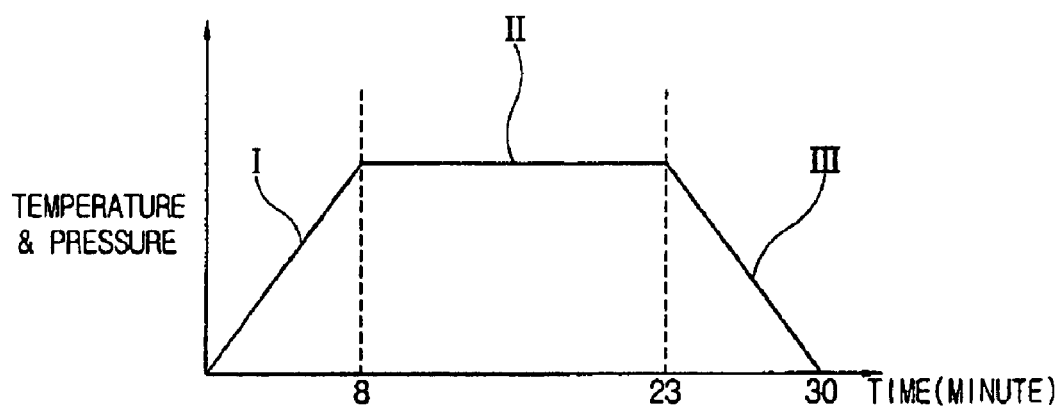
FIG. 2 is a graph showing the change of temperature and pressure in a chamber of the conventional bubble removing apparatus.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3A:
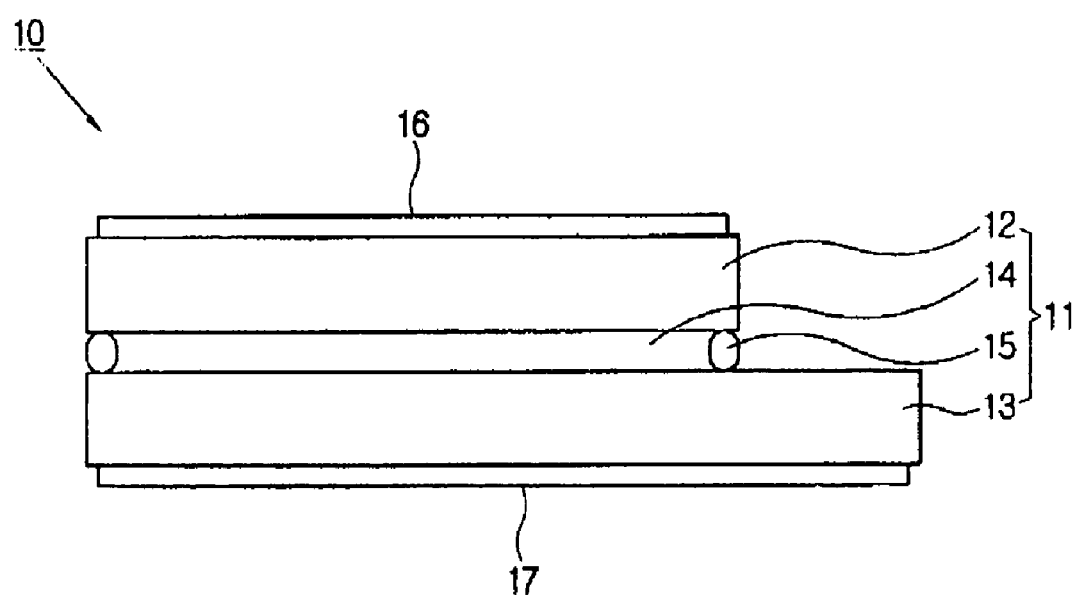
FIG. 3a and FIG. 3b are a sectional view of a liquid crystal panel and a sectional view explaining the forming of bubbles, respectively.
Figure 3B:
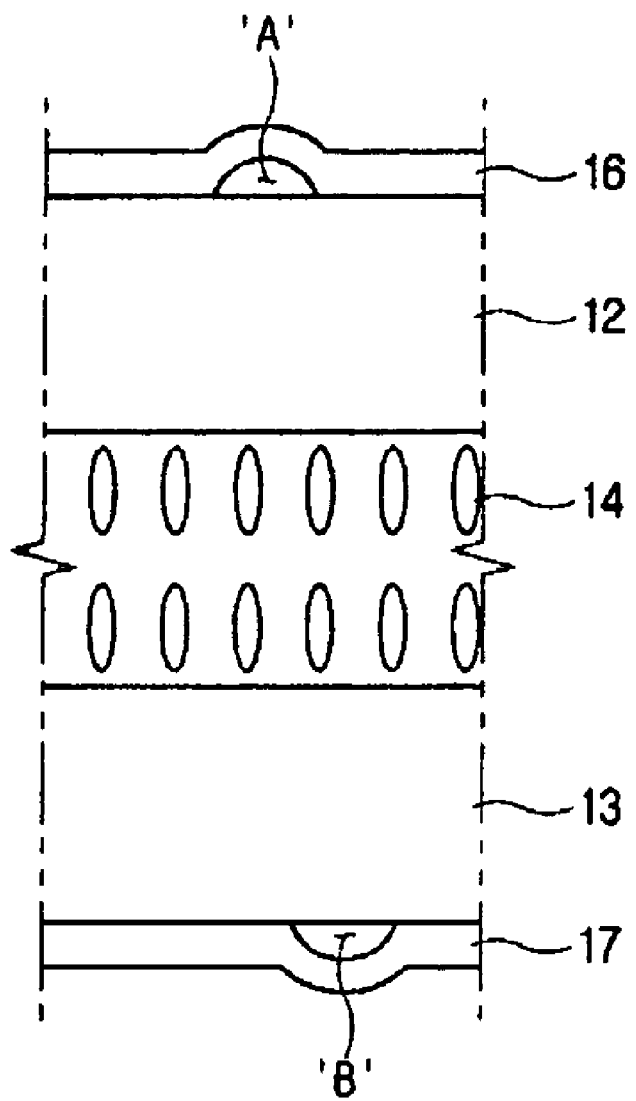

FIG. 3a and FIG. 3b are a sectional view of a liquid crystal panel and a sectional view explaining the formation of bubbles, respectively.

The liquid crystal panel 10 comprises a substrate assembly 11 and polarizing plates 16 and 17 which are attached to the plate surfaces of the substrate assembly 11.

The substrate assembly 11 comprises a color filter substrate 12, a TFT substrate 13 and a liquid crystal layer 14. The liquid crystal layer 14 is enclosed by the substrates 12 and 13 and a sealant 15. Generally the TFT substrate 13 is somewhat larger than the color filter substrate 12 to provide a driving circuit mounting space.

The color filter substrate 12 comprises a black matrix, a color filter layer and a common electrode. The TFT substrate 13 comprises a TFT, a gate line, a data line and a pixel electrode. The alignment of liquid crystal layer 14 is changed by the voltage between the common electrode and the pixel electrode.

The polarizing plates 16 and 17 are respectively attached to the plate surfaces of the substrate assembly 11, that is, the outer surfaces of the color filter substrate 12 and the TFT substrate 13. The polarizing plates 16 and 17 are provided in LCDs which use the birefringence property of the liquid crystal layer 14. The polarizing plates 16 and 17 can be attached to the substrate assembly 11 using a compression roller.

The LCD comprises the liquid crystal display panel 10, a backlight unit (not shown) disposed behind the TFT substrate 13, a driving circuit (not shown) and a outer casing (not shown) accommodating the above components.

However, bubbles (shown in FIG. 3B as bubbles 'A' and 'B') are formed between the polarizing plates 16 and 17 and the substrates 12 and 13. The bubbles lower the adhesion force therebetween and deteriorate display quality.

Figure 4A:
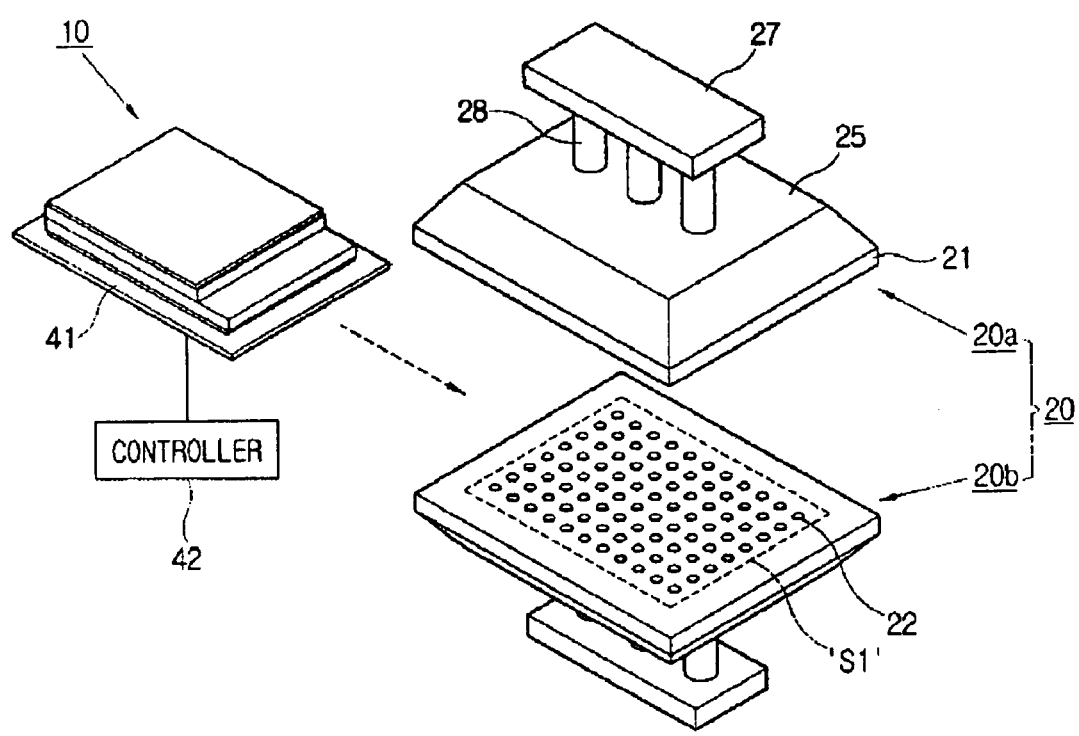
FIG. 4a and FIG. 4b are a perspective view showing a bubble removing apparatus and a cross sectional view explaining the removal of bubbles, respectively, according to a first embodiment of the present invention.
Figure 4B:
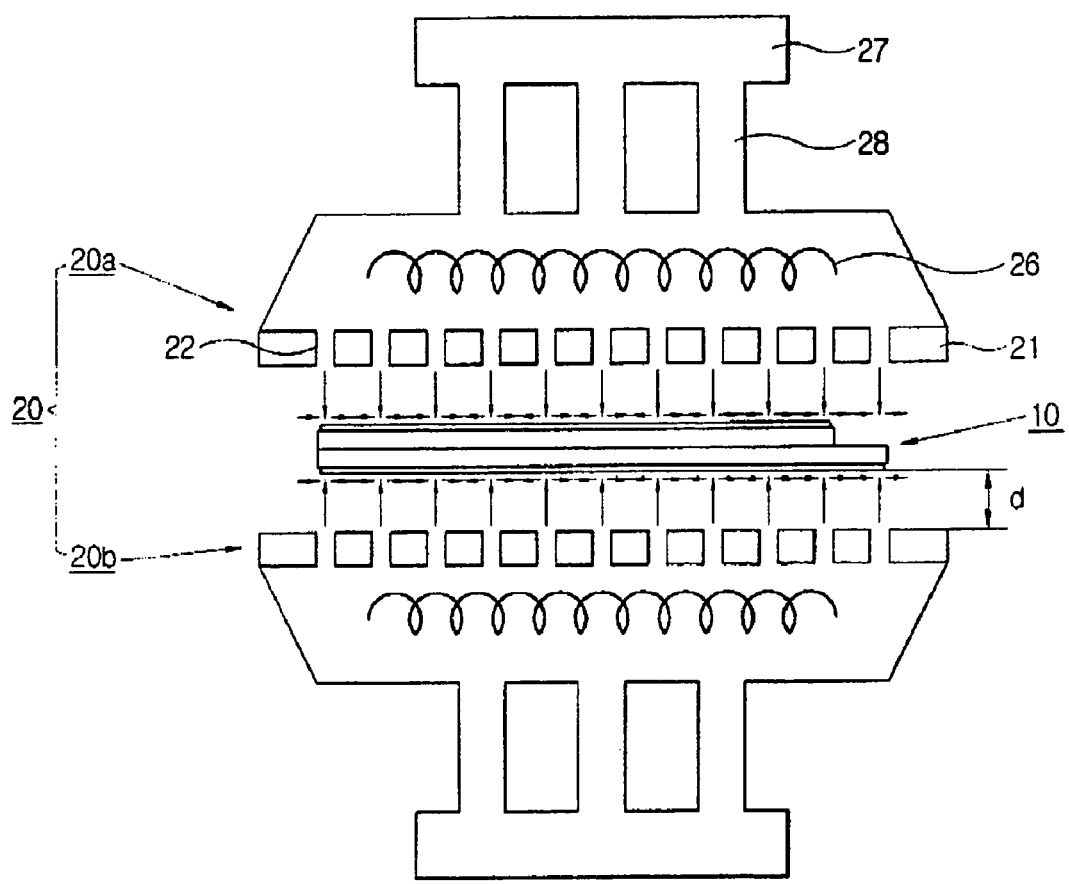

FIG. 4a and FIG. 4b are a perspective view showing a bubble removing apparatus and a cross sectional view illustrating the removal of bubbles, respectively, according to a first embodiment of the present invention.

The bubble removing apparatus 20 according to the first embodiment comprises a upper unit 20a and a lower unit 20b, wherein the upper unit 20a and the lower unit 20b have substantially the same configurations. Hereafter the explanation will be focused on the upper unit 20a, but it will be understood that the description will apply to the lower unit 20b as well.

The bubble removing apparatus 20 comprises a gas injecting part 21 to inject gas. The gas injecting part 21 of the upper unit 20a and the gas injecting part 21 or the lower unit 20b are disposed to be parallelly opposite each other. The gas injecting part 21 has an approximately rectangular plate shape and includes nozzles 22, which are disposed uniformly across the surface of the upper unit 20a. Preferably, as many nozzles 22 as possible are provided. Preferably but not necessarily, the injecting area (S1), where the gas is injected through the nozzles 22, is substantially larger than the size of the liquid crystal panel 10.

A preheating part 25 is provided on the upper part of the gas injecting part 21 to preheat the gas to a predetermined temperature before injection. A heating wire 26 is provided in the preheating part 25 to heat the gas.

The preheating part 25 preheats the compressed gas from a compressed gas supply part 27 and then supplies the preheated compressed gas to the gas injecting part 21. Thus the preheating part 25 should have a space to allow the gas to pass therethrough. The compressed gas supply part 27 may comprise a fan or a pump, and is connected to the preheating part 25 through one or more connecting tubes 28. The gas compressed by the compressed gas supply part 27 is preferably but not necessarily air.

It is preferable that the bubble removing apparatus 20 according to the first embodiment further comprises a temperature sensor and a pressure sensor to sense the temperature and the pressure of the compressed gas respectively. It is more preferable that the bubble removing apparatus 20 according to the first embodiment further comprises a temperature controller and a pressure controller to control the temperature of the preheated gas of the preheating part 25 and the pressure of the compressed gas of the compressed gas supply part 27, respectively.

The bubble removing apparatus 20 described above is not installed in an enclosed chamber but exposed to the atmosphere. In addition, the condition of bubble removing using the bubble removing apparatus 20 may be room temperature and atmospheric pressure.

The method of removing bubbles in the liquid crystal panel 10 using the above described bubble removing apparatus 20 will be described as follows.

The liquid crystal panel 10 is disposed between the upper unit 20a and the lower unit 20b before the gas is injected through the nozzles 22. That is, the gas injecting part 21 is arranged to face the plate surface of the liquid crystal panel 10. It is preferable that the upper unit 20a and the lower unit 20b are separated from each other during the positioning of the liquid crystal panel 10, and then brought together once the liquid crystal panel 10 is completely positioned. For the purpose of the above, the bubble removing apparatus 20 preferably but not necessarily further comprises a vertical moving part (not shown) to move at least one of the upper unit 20a and lower unit 20b vertically.

The liquid crystal panel 10 is moved to the bubble removing apparatus 20 by a moving part 41. A controller 42 adjusts the movement of the liquid crystal panel 10 by controlling the moving part 41 allowing the liquid crystal panel 10 to be moved.

When the liquid crystal panel 10 is disposed between the upper unit 20a and the lower unit 20b, the gas is injected through the nozzles 22 towards the plate surfaces of the liquid crystal panel 10, thereby causing the liquid crystal panel 10 to float between the upper unit 20a and the lower unit 20b. In an embodiment of the present invention, the liquid crystal panel 10 contacts and is supported by the lower unit 20b before the gas is injected, and then floats by gas injection. Further, the liquid crystal panel 10 can be supported by an additional support part (not shown) before the gas is injected, and then floats by gas injection.

The procedure of gas injection will be explained as follows. The gas is compressed by the compressed gas supply part 27, and then the compressed gas is supplied to the preheating part 25 through the connecting tube 28. Subsequently the compressed gas is heated to the predetermined temperature by the heating wire 26 in the preheating part 25. The preheated gas is injected uniformly through the nozzles 22 provided in the gas injecting part 21.

In some embodiments, the gas injection of the lower unit 20b is substantially stronger than that of the upper unit 20a, thereby causing the liquid crystal panel 10 to float between the upper unit 20a and the lower unit 20b. When the liquid crystal panel 10 floats, the distance between the liquid crystal panel 10 and the nozzles 22 of the lower unit 20b is preferably 10-20 μm, and the distance 'd' between the liquid crystal panel 10 and the nozzles 22 of the upper unit 20a is also preferably 10-20 μm.

The gas is injected to the plate surface of the floating liquid crystal panel 10 for a predetermined time through the nozzles 22, thereby applying a pressure to the outer surfaces of the liquid crystal panel 10. The gas injected through the nozzles 22 was heated by the preheating part 25 and was compressed by the compressed gas supply part 27. The temperature and the pressure of the injected gas may be appropriately adjusted by controlling the preheating part 25 and the compressed gas supply part 27.

The pressure applied to the liquid crystal panel 10 by the injected gas is preferably 0.1-6.0 kgf/cm$^2$, and the preheating temperature of the gas is preferably 40-80° C. Because the time for the preheated gas to reach the liquid crystal panel 10 is short, the temperature of the gas at the plate surface of the liquid crystal panel 10 is also approximately 40-80° C. By using preheated gas of 40-80° C., the viscosity of an adhesive, which is used to attach the polarizing plates 16 and 17 to the substrates 12, 13 can be decreased, increasing the ease of removal of the bubbles contained within the adhesive. Depending on the type of adhesive used, if the temperature of the preheated gas is lower than 40° C., the viscosity of the adhesive is not sufficiently decreased. If the temperature of the preheated gas is higher than 80° C., the polarizing plates 16 and 17 can be damaged. The bubbles of the liquid crystal panel 10 are gradually moved to the edge of the liquid crystal panel 10 by the heat and pressure of the injected gas, and finally removed from the liquid crystal panel 10.

When the removal of the bubbles is completed, the injection of the gas through the nozzles 22 is stopped and then the liquid crystal panel 10 is removed from the bubble removing apparatus 20.

In another embodiment of the present invention, the liquid crystal panel 10 is translated to be positioned between the upper unit 20a and the lower unit 20b while the gas is being injected. Also, the liquid crystal panel 10 is supported by a support part (not shown) during positioning of the liquid crystal panel 10 between the upper unit 20a and the lower unit 20b or removal of the bubbles.

The bubble removing apparatus according to the first embodiment of the present invention may be modified in various ways. For example, the lower unit 20b can be omitted. In such a case, the gas injection is applied to the each side of the liquid crystal panel 10 separately, not simultaneously. Also a support part (not shown) for supporting the liquid crystal panel 10 should be provided.

Figure 5A:
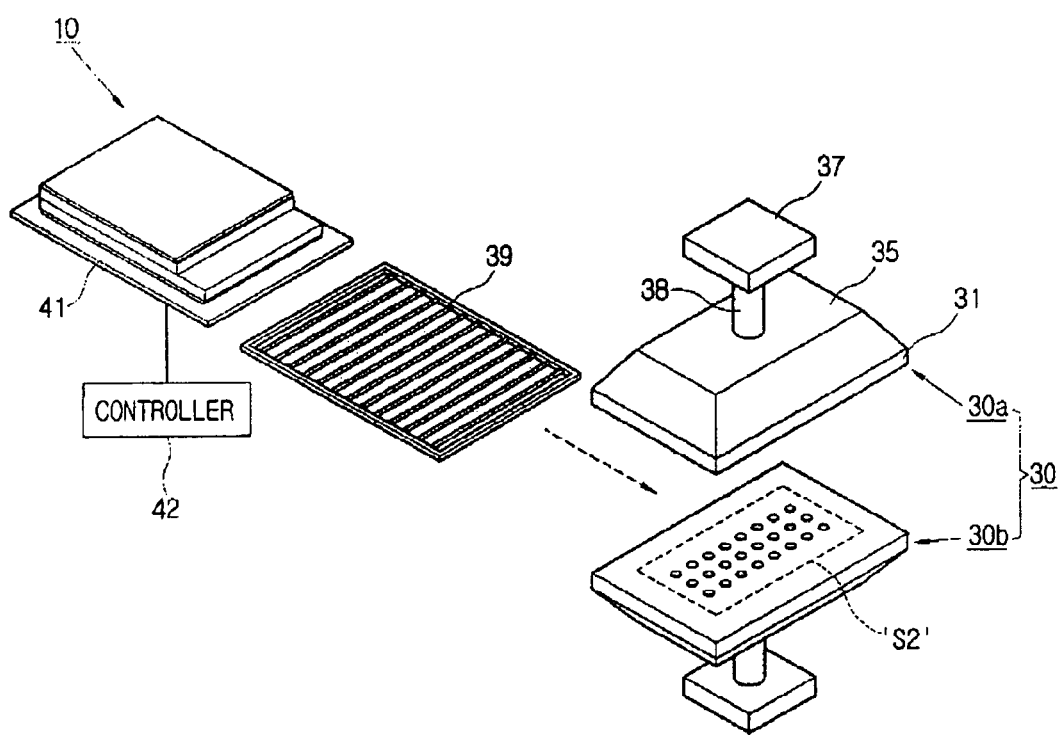
FIG. 5a and FIG. 5b are a perspective view showing a bubble removing apparatus and a cross sectional view explaining the removal of bubbles, respectively, according to a second embodiment of the present invention.
Figure 5B:
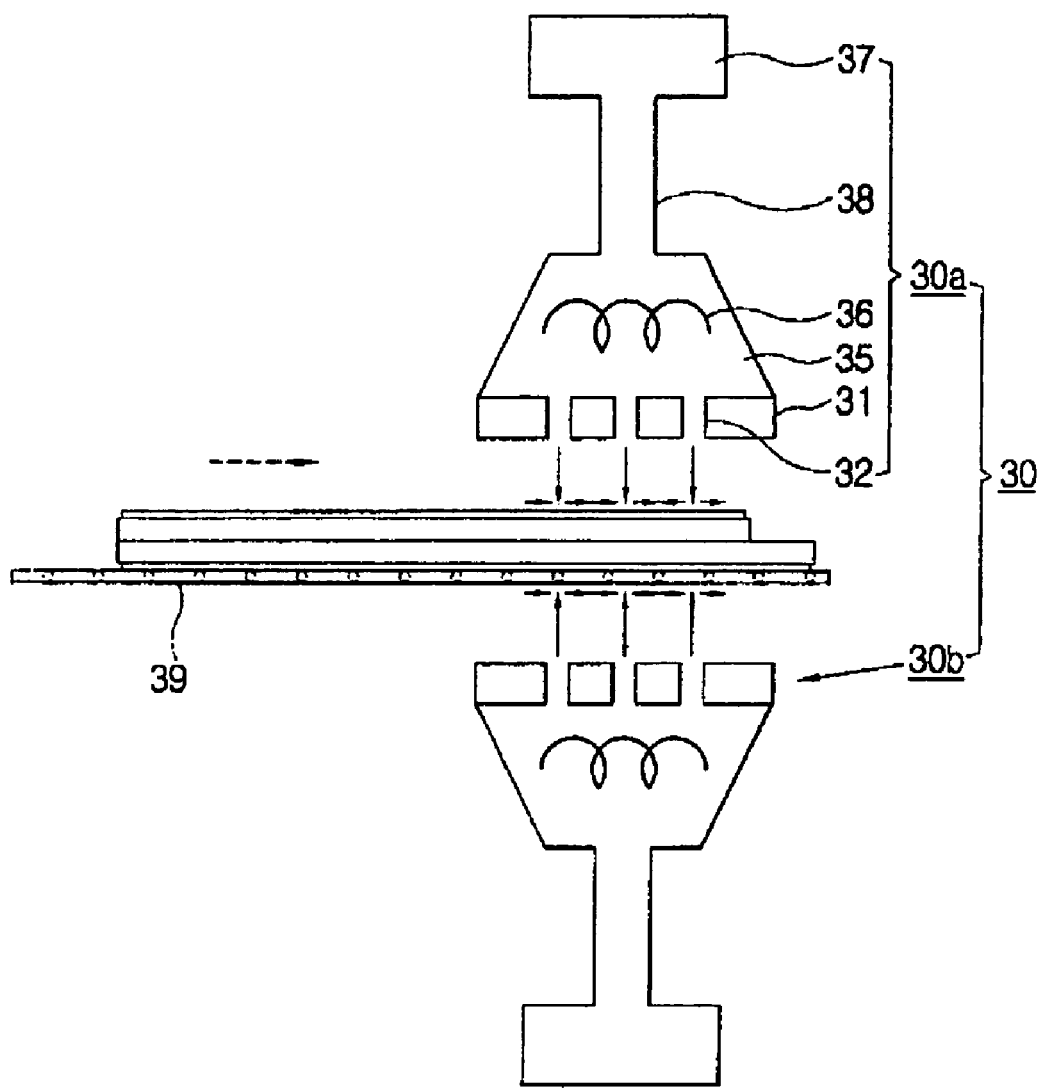

FIG. 5a and FIG. 5b are a perspective view showing a bubble removing apparatus and a cross sectional view illustrating the removal of bubbles, respectively, according to a second embodiment of the present invention.

The bubble removing apparatus 30 according to the second embodiment comprises a upper unit 30a and a lower unit 30b, wherein the upper unit 30a and the lower unit 30b have essentially the same configurations.

The upper unit 30a comprises a gas injecting part 31, one or more nozzles 32, a preheating part 35, a heating wire 36, a compressed gas supply part 37, and a connecting tube 38 similar to the upper unit 20a of the first embodiment. Further, the gas injecting part 31 of the upper unit 30a and the gas injecting part 31 of the lower unit 30b are disposed to be parallelly opposite each other.

The injecting area (S2) to which the gas is injected through the nozzle 32 is band-shaped, and is smaller than the planar surface area of the liquid crystal panel 10. For example, the liquid crystal panel 10 may have a substantially rectangular planar surface having a first dimension and a second dimension. The length of the injecting area (S2) is similar to or longer than the first planar dimension of the liquid crystal panel 10, while the width of the injecting area (S2) is smaller than the second planar dimension of the liquid crystal panel. In one embodiment, the length of the injecting area (S2) is similar to or longer than the smaller of the first and second dimensions of the planar surface of the liquid crystal panel 10. In another embodiment of the present invention, the nozzle 32 is provided as a single nozzle which forms a band-shaped injecting area.

The bubble removing apparatus 30 according to the second embodiment further comprises a support part 39 to support the liquid crystal panel 10. As shown in FIG. 5b, the structure of the support part 39 is designed to expose as much of the outer surface of the liquid crystal panel 10 as possible.

The bubble removing apparatus 30 described above is not installed in an enclosed chamber but exposed to the atmosphere. In addition, the condition of a bubble removing process using the bubble removing apparatus 30 may be room temperature and atmospheric pressure.

The method of removing bubbles from the liquid crystal panel 10 using the above-described bubble removing apparatus 30 will be described.

The liquid crystal panel 10 is seated on the support part 39 before or after the gas is injected through the nozzles 32. Then, the support part 39 is translated to position the liquid crystal panel 10 between the upper part 30a and the lower part 30b. As the injecting area (S2) of the gas injecting part 31 is smaller than the planar surface of the liquid crystal panel 10, the liquid crystal panel 10 and the gas injecting part 31 are translated relative to each other while the gas is injected so that the pressure from the injected gas is applied onto the entire surface of the liquid crystal panel 10.

A moving part 41 moves the liquid crystal panel 10 to be adjacent to the support part 39. A controller 42 adjusts the movement of the liquid crystal panel 10 by controlling the moving part 41.

The bubble removing apparatus 30 according the second embodiment preferably further comprises a driving part which drives the support part 39 and a drive controller for controlling the driving part.

When the liquid crystal panel 10 is disposed between the upper unit 30a and the lower unit 30b, the gas is injected to the plate surface of the liquid crystal panel 10 through the nozzles 32, thereby applying a pressure to the liquid crystal panel 10.

The gas injected through the nozzles 32 was heated by the preheating part 35 and was compressed by the compressed gas supply part 37. The temperature and the pressure of the gas can be appropriately adjusted by controlling the preheating part 35 and the compressed gas supply part 37.

The applied pressure to the liquid crystal panel 10 by the injected gas is preferably 0.1-6.0 kgf/cm$^2$, and the preheating temperature of the gas is preferably 40-80° C. Because the time for the preheated gas to reach the liquid crystal panel 10 is short, the temperature of the gas at the plate surface of the liquid crystal panel 10 is also 40-80° C. The bubbles in the liquid crystal panel 10 are removed by the heat and pressure of the injected gas.

Then, the entire plate surface of the liquid crystal panel 10 is subjected to the pressure sequentially by moving the support part 39 while the gas is continuously injected onto the liquid crystal panel 10. In another embodiment of the present invention, the bubble removing apparatus 30 is moved while the support part 39 is fixed. The relative movement between the liquid crystal panel 10 and the bubble removing apparatus 30 can be performed continuously or intermittently.

In the second embodiment, the size of the bubble removing apparatus 30 is small with respect to the first embodiment. Further the removing of the bubble can be operated continuously. Particularly, the moving part 41, which moves the liquid crystal panel 10, can be used as the support part 39 at the same time, thus omitting the step of transporting of the liquid crystal panel 10 from the moving part 41 to the support part 39.

The bubble removing apparatus 30 according to the second embodiment of the present invention may be modified in various ways. For example, the lower unit 30b can be omitted. In such case, the removal of the bubbles should be performed by injecting gas onto each side of the liquid crystal panel 10 separately, not simultaneously.

Figure 6:
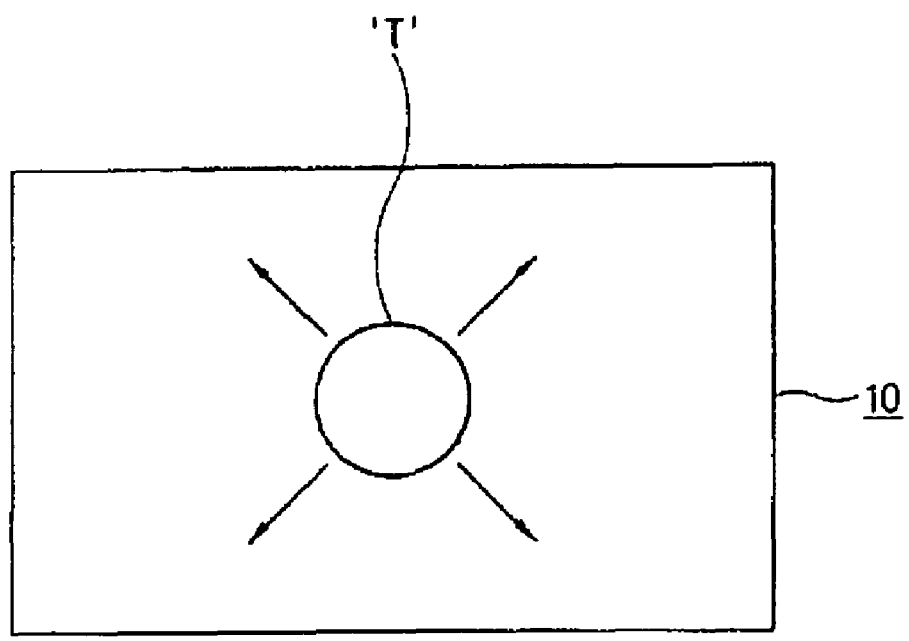
FIG. 6 is a concept view of a bubble removing apparatus according to a third embodiment of the present.

FIG. 6 is a conceptional view of a bubble removing apparatus according to a third embodiment of the present. The gas is initially injected to the center part (T) of the liquid crystal panel 10, thereby applying a pressure to the liquid crystal panel 10. Then, the gas injecting area gradually increases while making concentric circles, to eventually remove bubbles from the entire planar surface of the liquid crystal panel 10. In the third embodiment, the control of the gas injection may be more complex than the embodiments described above, but the removal of the bubbles is effective. Also, the bubble removal can be performed to both of the plate surfaces of the liquid crystal panel 10 at the same time, or separately.

Though the upper unit 20a and 30a and the lower unit 20b and 30b have substantially the same structure in the above embodiments, in other embodiments, a single preheating part 25 and 35 and/or a single compressed air supply part 27 and 37 can be provided for supplying the heated, compressed gas to both the upper unit 20a and 30a and the lower unit 20b and 30b, thereby to be injected from both units.

The bubble removing apparatus as described above may be exposed to the atmosphere, which means it does not need any enclosed chamber. In addition, the bubble removing method as described above may be performed at room temperature and atmospheric pressure. Thus, time loss for increasing and decreasing the temperature and the pressure does not exist, and the present invention is suitable for the automation of LCD manufacturing process because the removal of bubbles can be performed continuously.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of manufacturing an LCD comprising:
   preparing a liquid crystal panel which comprises at least one substrate and at least one polarizing plate, wherein the polarizing plate is attached to the substrate and is separated from a gas injecting part;
   disposing the liquid crystal panel having the polarizing plate attached to the substrate adjacent the gas injecting part after preparing the liquid crystal panel;
   disposing the gas injecting part towards a surface of the polarizing plate after disposing the liquid crystal panel, while the gas injecting part is exposed to atmospheric conditions; and
   applying a pressure to the surface of the polarizing plate by injecting gas through the gas injecting part after disposing the gas injecting part.

2. The method according to claim 1, wherein the liquid crystal panel and the gas injecting part move relative to each other, while the gas is injected.

3. The method according to claim 1, wherein the injected gas is preheated.

4. The method according to claim 3, wherein the temperature of the preheated gas is 40-80° C.

5. The method according to claim 1, wherein the gas injecting part comprises a plurality of nozzles to inject the gas, which are disposed opposite each other while the liquid crystal panel is disposed therebetween.

6. The method according to claim 1, wherein a distance between the gas injecting part and the liquid crystal panel is 10-20 μm.

7. The method according to claim 1, wherein the pressure applied by the injecting gas is 0.1-6.0 kgf/cm$^2$.

8. The method according to claim 1, wherein the gas is initially injected to a central region in the liquid crystal panel and is later injected to an outer region of the plate surface of the liquid crystal panel.

9. A method of manufacturing an LCD comprising:
preparing a liquid crystal panel by attaching at least one polarizing plate to at least one substrate, wherein the polarizing plate is separated from a gas injecting part;
disposing the liquid crystal panel adjacent the gas injecting part after preparing the liquid crystal panel;
disposing the gas injecting part towards a surface of the polarizing plate after disposing the liquid crystal panel; and
applying a pressure to the surface of the polarizing plate by injecting gas through the gas injecting part after disposing the gas injecting part.

10. The method according to claim 9, wherein disposing the gas injecting part towards the surface of the polarizing plate occurs while the gas injecting part is exposed to atmospheric conditions.

11. The method according to claim 9, further comprising heating the injected gas to a temperature of 40-80° C.

12. The method according to claim 9, wherein the gas injecting part comprises a plurality of nozzles adapted to inject the gas toward the surface of the polarizing plate.

13. The method according to claim 9, wherein a distance between the gas injecting part and the liquid crystal panel is 10-20 μm.

14. The method according to claim 9, wherein the pressure applied by the injecting gas is 0.1-6.0 kgf/cm$^2$.

15. The method according to claim 9, wherein the gas is initially injected to a central region of the liquid crystal panel and is later injected to an outer region of the plate surface of the liquid crystal panel.

* * * * *